Figure 1:
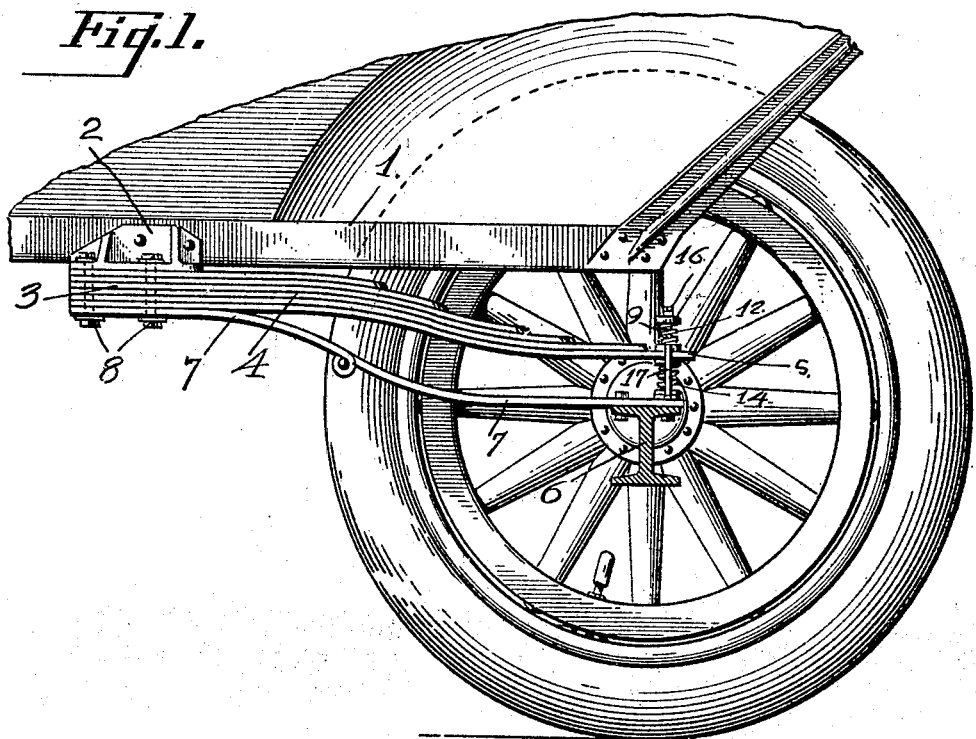

I. C. NELSON.
SHOCK ABSORBER.
APPLICATION FILED MAY 16, 1918.

1,293,166.

Patented Feb. 4, 1919.

Inventor.
Irving C. Nelson.
By Arthur L. Lee.
Atty.

UNITED STATES PATENT OFFICE.

IRVING C. NELSON, OF SAN ANSELMO, CALIFORNIA.

SHOCK-ABSORBER.

1,293,166.　　　　　Specification of Letters Patent.　　Patented Feb. 4, 1919.

Application filed May 16, 1918. Serial No. 235,030.

*To all whom it may concern:*

Be it known that I, IRVING C. NELSON, a citizen of the United States, residing at San Anselmo, in the county of Marin and State of California, have invented a new and useful Improvement in Shock-Absorbers, of which the following is a specification.

My invention relates to improvements in shock absorbers for the type of motor vehicle springs known as semi-cantaliver springs wherein a radius member operates in conjunction with a pair of springs to resiliently secure the flexible ends of said semi-cantaliver springs upon the axles of the vehicle; and the objects of my invention are—

First, to provide an improved shock absorber for semi-cantaliver springs;

Second, to provide improved means for resiliently mounting the flexible ends of semi-cantaliver springs on the axles of a vehicle; and Third, to provide an improved device of the character described having means for preventing a lateral movement in a horizontal plane of the flexible ends of the semi-cantaliver springs.

I accomplish these several objects by means of the device disclosed in the drawings forming a part of the present specification wherein like characters of reference are used to designate similar parts throughout the said specification and drawings, and in which—

Figure 2:
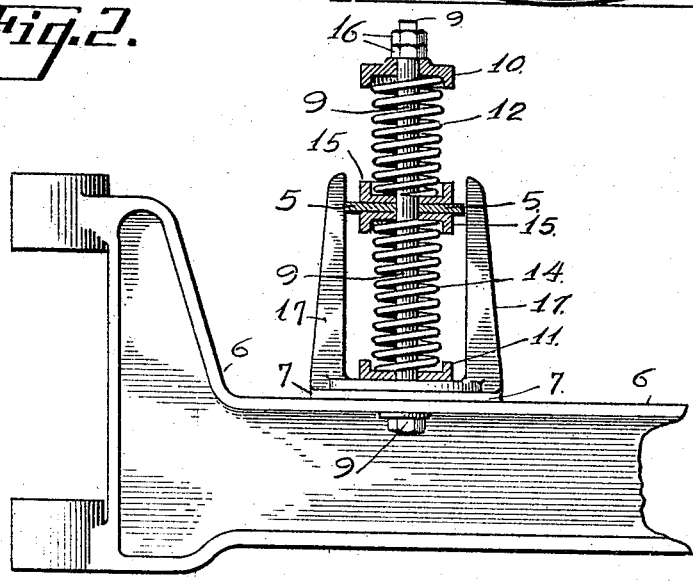

Figure 1 is a broken side elevation of the front side portion of a motor vehicle the near wheel being removed to disclose the manner in which the flexible ends of the semi-cantaliver springs are resiliently mounted upon the front axle of the vehicle; and Fig. 2 is a front elevation, on an enlarged scale, of a portion of a front axle disclosing the means for preventing a lateral movement of the flexible ends of the semi-cantaliver springs.

Referring to the drawings the numeral 1 is used to designate the frame or chassis of a motor vehicle to which, in the present state of the art, are secured brackets 2. What I term the rigid ends 3 of semi-cantaliver springs 4 are rigidly secured to the chassis 1 by means of said bracket 2 while the front or flexible ends 5 of said semi-cantaliver springs 4 are, at present, secured to the front axle 6 of the vehicle.

The arrangement for the rear axle is substantially similar in construction and operation. Therefore a description of the front axle will suffice.

In my invention I disconnect the front or flexible ends 5 of the semi-cantaliver springs 4 from the axle 6.

A radius member 7 is secured below the lowermost leaf of the springs 4 by means of bolts 8 passing through the bracket 2 and said member 7 at one end, the other end being rigidly secured to the axle 6 in place of the removed front or flexible end 5 of the springs 4, or, more correctly, of the lowermost leaf of said springs 4, as disclosed in Fig. 1 of the drawings.

A vertically disposed bolt 9 is secured to the axle 6 and slidably engages the front or flexible end 5 of the lowermost leaf of the springs 4. A pair of springs 12 and 14 are mounted upon the bolt and above and below the end 5 of the spring 4, said springs 12 and 14 resting within suitable cup-washers 10 and 11 at opposite ends of the bolt 9. Other cup washers 15 are interposed between the adjacent ends of the springs 12 and 14 and the front end 5 of the spring 4 to retain the said springs 12 and 14 in alinement. The tension of said springs 12 and 14 may be adjusted by means of suitable check nuts 16 mounted upon the upper end of the bolt 9.

To prevent a lateral movement of the free or flexible end 5 of the springs 4 in a horizontal plane I have provided vertically disposed guides 17 which are secured to the axle 6 and arranged on each side of the free ends 5 of the springs 4.

In operation the radius member 7 operates as a radius rod to retain the proper position of the chassis or frame 1 relatively to the axle 6 so that the flexible ends of the springs 4 may move relatively to said axle 6.

A vertical movement of the flexible ends 5 of the springs 4 upon the bolts 9 is resiliently resisted by means of the springs 12 and 14 thereby providing an effective and adjustable means whereby excessive road shocks may be partially absorbed thereby relieving the semi-cantaliver springs of undue shocks, the tension of the said springs 12 and 14 being readily adjusted by the nuts 16 on the upper ends of the bolts 9.

Any lateral movement, in a horizontal plane, of the flexible ends 5 of the springs 4 will be prevented by the vertically disposed guides 17 on the axle 6.

It is obvious from the foregoing that I have provided an improved shock absorber for semi-cantaliver springs.

Having thus described my invention what I claim as new and desire to secure by Letters Patent is—

1. The combination with a motor vehicle having semi-cantaliver springs with their rigid ends rigidly secured to the frame of the vehicle and their flexible ends resting over the axles of said vehicle of a shock absorber comprising a radius member lying directly under said springs and having one end secured to said rigid ends and the other end to one of the axles of said vehicle and directly under the flexible ends of said springs; a vertically disposed bolt secured to the forward end of the radius member and slidably engaging the flexible ends of the springs; and a pair of springs mounted upon the bolt, one on either side of the flexible ends of the semi-cantaliver springs to resiliently resist a vertical movement of said flexible ends.

2. The combination with a motor vehicle having semi-cantaliver springs with their rigid ends rigidly secured to the frame of the vehicle and their flexible ends resting over the axles of said vehicle of a shock absorber comprising a radius member lying directly under said springs and having one end secured to said rigid ends and the other end to one of the axles of said vehicle and directly under the flexible ends of said springs; a vertically disposed bolt secured to the forward end of the radius member and slidably engaging the flexible ends of the springs; and a pair of springs mounted upon the bolt, one on either side of the flexible ends of the semi-cantaliver springs to resiliently resist a vertical movement of said flexible ends; and means for preventing a lateral movement of the flexible ends of the semi-cantaliver springs.

3. The combination with a motor vehicle having semi-cantaliver springs with their rigid ends rigidly secured to the frame of the vehicle and their flexible ends resting over the axles of said vehicle of a shock absorber comprising a radius member lying directly under said springs and having one end secured to said rigid ends and the other end to one of the axles of said vehicle and directly under the flexible ends of said springs; a vertically disposed bolt secured to the forward end of the radius member and slidably engaging the flexible ends of the springs; and a pair of springs mounted upon the bolt, one on either side of the flexible ends of the semi-cantaliver springs to resiliently resist a vertical movement of said flexible ends; and vertical guides mounted upon the axles of the vehicle and on each side of the flexible ends of the springs to prevent a lateral movement in a horizontal plane of said flexible ends.

In witness whereof I hereunto set my signature.

IRVING C. NELSON.